United States Patent [19]

Herdeg

[11] Patent Number: 4,832,100
[45] Date of Patent: May 23, 1989

[54] TIRE CHAIN

[75] Inventor: Karl Herdeg, Aalen, Fed. Rep. of Germany

[73] Assignee: Eisen- und Drahtwerk Erlau Aktiengesellschaft, Aalen, Fed. Rep. of Germany

[21] Appl. No.: 87,572

[22] Filed: Aug. 20, 1987

[30] Foreign Application Priority Data

Aug. 20, 1986 [DE] Fed. Rep. of Germany ....... 3628287

[51] Int. Cl.$^4$ .................. B60C 27/06; A44B 21/00
[52] U.S. Cl. .................. 152/213 R; 152/239; 152/241; 24/590
[58] Field of Search ............... 152/213 R, 213 A, 217, 152/219, 223, 231, 239, 241, 242, 172, 175, 177, 182, 188, 191; 24/298, 299, 590, 596, 595; 403/348, 349, 229, 329; 279/76, 79, 89, 93

[56] References Cited

U.S. PATENT DOCUMENTS

2,192,227  3/1940  Hill .................. 152/213 R
2,505,724  4/1950  Robbins .................. 152/213 R Primary Examiner—David Simmons
Assistant Examiner—Greogry J. Wilber
Attorney, Agent, or Firm—Becker & Becker, Inc.

[57] ABSTRACT

A tire chain having a tread portion that connects an inner portion with an outer portion. The inner portion is provided with a closure, one closure member of which, from a starting position, can be connectable and releasable from the other closure member via a twisting movement. In the twisted position, a return force is operative that acts in the direction toward the starting position. The torsional movement of this one closure member can be easily undertaken. The return force that is operative in the twisted position automatically returns the closure member, after its release, into its starting position, whereupon the closure is properly closed.

22 Claims, 7 Drawing Sheets

TIRE CHAIN

BACKGROUND OF THE INVENTION

The present invention relates to a tire chain having a tread portion that interconnects an inner portion and an outer portion, with at least one of these portions being provided with a closure that has two closure members, namely a first closure member and a second cooperating closure member.

With known tire chains of this general type, the closure, which is disposed on the inside, generally comprises a hook element into which a chain link is hooked. So that the hooked chain link cannot accidentally slide out of the hook element, it is necessary to take special safety precautions; this makes the manufacture of the tire chain more expensive, and increases the structural outlay. In addition, such a closure is complicated and difficult to manipulate.

It is therefore an object of the present invention to improve a closure for a tire chain of the aforementioned general type in such a way that, with a structurally straight forward configuration, the closure can be easily closed and released; however, when the closure is closed, the closure members must be held together absolutely reliably without the requirement for additional safety or retaining elements.

BRIEF DESCRIPTION OF THE DRAWINGS

These and other objects and advantages of the present invention, will appear more clearly from the following specification in conjunction with the accompanying schematic drawings, in which.

SUMMARY OF THE INVENTION

The tire chain of the present invention is characterized primarily in that at least one of the closure members, from a starting position, is connectable and releasable from the other closure member via a twisting movement, with a return force, which acts in the direction toward the starting position, being operative in the twisted position.

With the inventive tire chain, to release or close the closure, it is merely necessary to rotate or twist one of the two closure members and in this twisted position to connect or release this closure member with the other closure member. This twisting movement of one of the closure members can be easily undertaken by a user of the inventive tire chain. Since the return force is operative in the twisted position of the closure member, when the latter is released it is automatically turned back into its starting position. To release the closure, it is merely necessary to turn the one closure member and in this twisted position to release it from the other closure member. As soon as the closure members are released from one another, the twisted closure member automatically returns to its starting position, after release, due to the return force. Thus, the closure of the inventive tire chain is very easy to operate, which is of particularly great advantage when this closure is disposed on the inner portion of the tire chain. Since then the closure cannot be seen by the user, at least during release, the straight forward and simple manner in which the inventive closure can be operated is very advantageous. To open the closure, a closure member must be turned or twisted counter to the return force. However, since such a twisting movement is precluded during operation of the tire chain, the closure cannot be automatically released, even under great stress. Furthermore, the inventive closure is distinguished by a straight forward construction that makes it very economical to manufacture the inventive tire chain.

Further specific features of the present invention will be described in detail subsequently.

DESCRIPTION OF PREFERRED EMBODIMENTS

Referring now to the drawings in detail, the tire chain is provided with, as an inner portion, the mounting ring 1, which is provided with connection locations 2 that are distributed over the length of the ring 1. As shown in FIG. 1A, the chain links 2a of the contact or tread grid 2b of the tire chain are connected at these connection locations 2. Via the tread grid 2b, the mounting ring 1 for the inner side of the tire is connected to a non-illustrated outer portion, which can be embodied as a chain strand or chain mesh. In order to secure the tire chain in place on the tire, the outer portion is provided with a tensioning or tightening member, such as a tension chain, a tensioning wire, etc., which is known per se.

Figure 1:
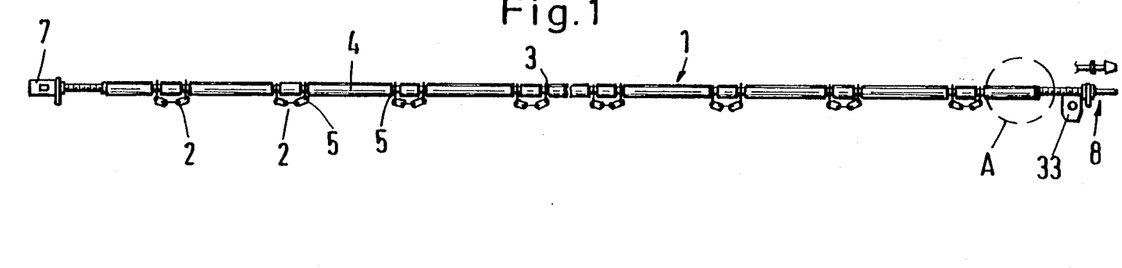
FIG. 1 is a view that shows the mounting ring of one exemplary embodiment of the inventive tire chain in an extended state, with a closure member and a cooperating closure member being provided on the ends of the mounting ring.
Figure 1A:
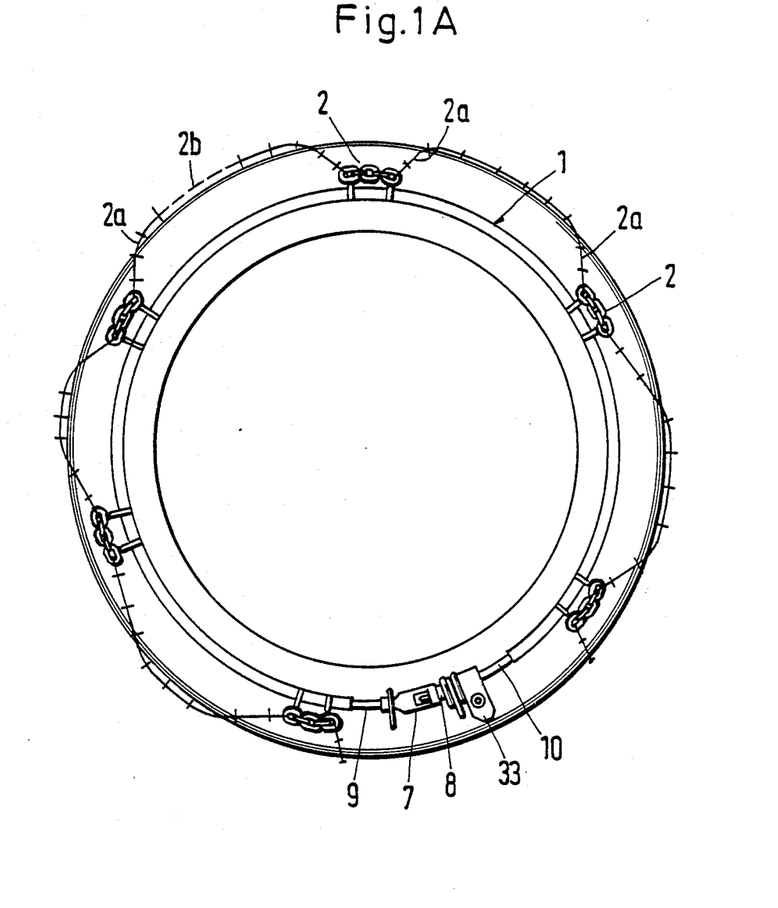
FIG. 1A is a view that shows the mounting ring of an inventive tire chain that has been mounted on a tire.
Figure 2:
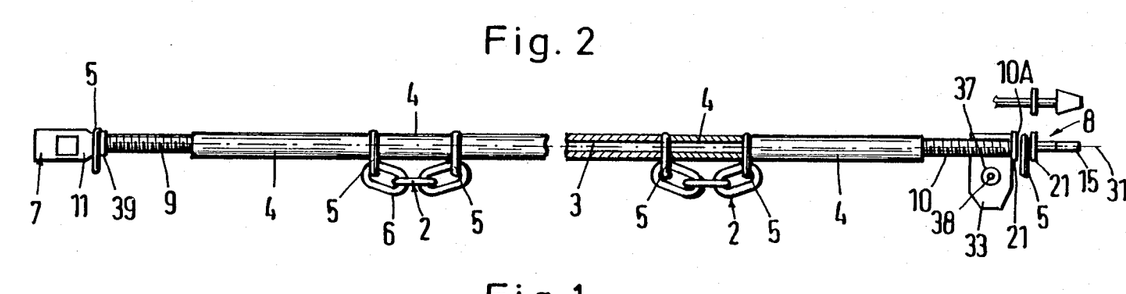
FIG. 2 is an enlarged and partially sectioned view of the mounting ring of FIG. 1.

In the embodiment illustrated in FIGS. 1 and 2, the mounting ring 1 includes a cable 3 on which are disposed hose sections or tubular pieces 4, which are preferably made of plastic. Adjacent tubular pieces 4 are separated from one another by chain links 5 of the connection location 2. So that the tire chain can be used, the chain links 5 are rotatably disposed on the cable 3. The tubular pieces 4 disposed in the region between adjacent connection locations 2 are longer than the tubular pieces 4 that are provided in the region of the latter. Each connection location 2 has two chain links 5 that are separated from one another by a short tubular piece 4, and that are interconnected by a short chain strand 6; in the illustrated embodiment, the chain strand 6 is formed by three chain links.

Disposed at the two ends of the mounting ring 1 is a closure member 7 and a cooperating closure member 8, each of which is secured to the cable 3 via a sleeve 9 or 10.

Figure 3:
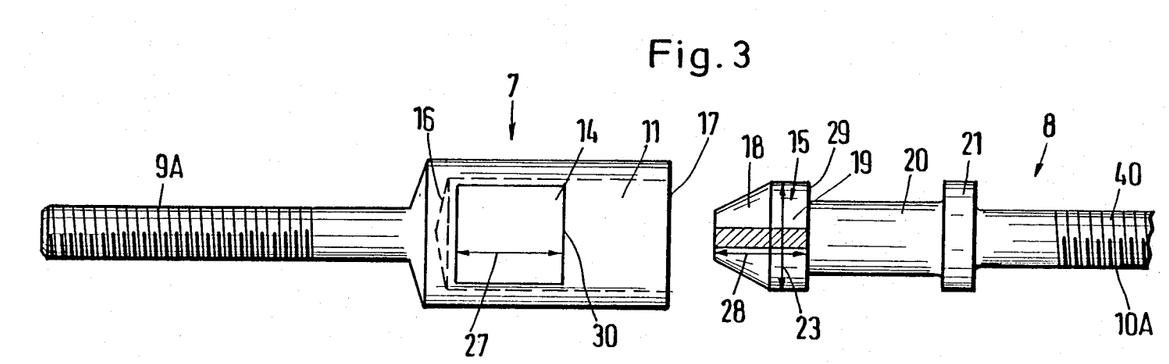
FIG. 3 is an enlarged view of the closure member and cooperating closure member of the mounting ring of FIG. 1.
Figure 4:
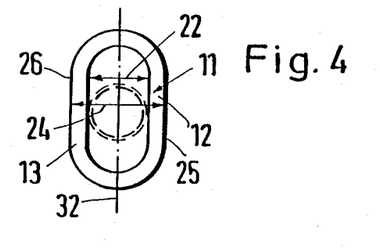
FIG. 4 is an end view of the closure member of FIG. 3.

The closure member 7 has a sleeve-like receiving element 11 for the cooperating closure member 8. As shown in FIG. 4, the sleeve element 11 has an oval cross-sectional shape. As shown in FIG. 3, a respective opening 14 is provided in each of the two sides 12 and 13, which are disposed parallel to one another. When the closure is closed, a locking element 15 of the cooperating closure member 8 extends through the openings 14. In the illustrated embodiment, each opening 14 has a quadrilateral contour, but could also have any other suitable contour. The openings 14 are disposed near the base 16 of the receiving element 11, and are spaced at a greater distance from the end face 17 of the latter. The receiving element 11 is considerably wider than is an elongated connector 9A, into which the free end of the cable 3 extends, and onto which the sleeve 9 is pressed.

The free end of the cooperating closure member 8 is provided with the locking element 15, which is embodied as a flat piece (FIGS. 1 and 2). The locking element 15 has a trapezoidal insertion part 18 (FIG. 3) that is connected to a collar 19, which when seen in elevation has a quadrilateral shape. The collar 19 is connected to an intermediate piece 20 that has a circular cross-sectional shape. The collar 19 is preferably integrally formed with the intermediate piece 20, which connects the collar 19 with a further collar 21.

As shown in FIG. 3, the insertion part 18 and the collar 19 each have a quadrilateral cross-sectional shape. In contrast, the intermediate piece 20 and the collar 21 have a circular cross-sectional shape. The diameter of the intermediate piece 20 corresponds to the width of the smaller side of the collar 19, so that the intermediate piece 20 does not extend to the side beyond the collar 19. The diameter of the other collar 21 corresponds to the length of the larger side of the collar 19. Connected to that side of the circular collar 21 remote from the intermediate piece 20 is a sleeve-like connector 10A into which the cable 3 extends and onto which the sleeve 10 is pressed.

The width of the insertion part 18 and of the collar 19 is slightly less than the smaller inside width 22 of the receiving element 11 of the closure member 7 (FIG. 4). However, the length 23 of the collar 19 is greater than the inside width 22, and preferably even greater than the distance 24 between the outer surfaces 25 and 26 of the sides 12 and 13. In this way, when the closure is closed, the locking element 15 extends through the openings 14 of the closure member 7 and beyond the outer surfaces 25, 26, so that a secure connection of the cooperating closure member 8 with the closure member 7 is assured. The length 27 of the openings 14, measured in the longitudinal direction of the closure member 7, is slightly greater than the length 28 of the locking element 15, measured in the longitudinal direction of the cooperating closure member 8. Since when the tire chain is mounted on the tire the closure member 7 and the cooperating closure member 8 are under tension, oppositely directed pulling forces act on them. Under these pulling forces, locking faces 29 of the locking element 15, which faces are disposed radially relative to the intermediate piece 20, are pressed tightly against that edge 30 of the openings 14 that faces the end face 17 of the receiving element 11. The locking faces 29 form the underside of the collar 19, which underside is remote from the insertion part 18.

Via their connectors 9a and 10a, the two closure members 7 and 8 are inserted into the sleeves 9 and 10, which are pressed onto the connectors. The ends of the cable 3 are also inserted into the sleeves 9 and 10, so that the closure members 7 and 8 can be reliably connected to the cable via the sleeves 9, 10. The cooperating closure member 8 is connected to the cable 3 in such a way that the central longitudinal plane 31 of the locking element 15 (see FIG. 2) is disposed transverse, and preferably at right angles, to that central longitudinal plane 32 (FIG. 4) that contains the longer axis of the receiving element 11 of the closure member 7.

In order to be able to close the closure 7, 8, either the cooperating closure member 8 or the closure member 7 must be rotated in such a way that the central longitudinal plane 31 of the locking element 15 coincides with the central longitudinal plane 32 of the closure member 7. In this position, the locking element 15 of the cooperating closure member 8 can be inserted into the receiving element 11. Since the cooperating closure member 8 is securely connected to the cable 3 via the sleeve 10, when the closure is closed, that end of the cable 3 that is associated with the cooperating closure member 8 is twisted. As soon as the insertion or locking element 15 passes into the region of the openings 14 of the receiving element 11, the cooperating closure member 8 is rotated back due to the torsional force, so that the central longitudinal planes 31 and 32 are again disposed transversely, and preferably at right angles, to one another. The locking element 15 then projects into the openings 14 of the receiving element 11, with the radial locking faces 29 of the element 15 resting against the edge 30 of the openings. Since the end of the cable 3 is twisted during insertion, the cooperating closure member 8 is automatically rotated back into its locking position as soon as the locking element 15 passes into the region of the openings 14 of the receiving element 11. The cooperating closure member 8 is securely arrested in the receiving element 11, so that an automatic loosening or release of the closure when the tire chain is mounted is precluded.

Figure 7:
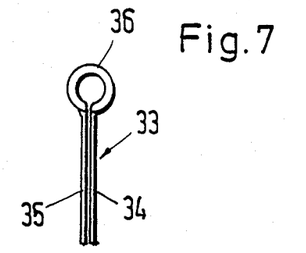
FIG. 7 is a side view of a handgrip for activating the cooperating closure member of the mounting ring when the closure is released or closed.

In order to facilitate the twisting process, a handgrip 33 (FIGS. 1, 2, and 7) which is formed from a flat piece, is fixed to the sleeve 10. The handgrip 33 has two plate members 34, 35 that rest against one another and merge into one another via a sleeve portion 36 that is pressed onto the sleeve 10. As shown in FIG. 2, the two plate members 34, 35 are securely connected to one another by a rivet 37. In addition, a raised portion 38 is provided on both sides of the handgrip 33 in order to assure that the handgrip 33 will be spaced from the tire when the chain is mounted thereon, thus assuring that the handgrip 33 can be easily grasped. Due to its large lever arm, the handgrip 33 makes it easy to turn the cooperating closure member 8 in order to close the closure. If the closure 7, 8 is to be opened again, the handgrip 33 can be easily grasped behind the tire, since due to the raised portion 38 the handgrip is spaced from the tire. It is then a simple matter to turn the handgrip 33 behind the tire so that the blocking element 15 of the cooperating closure member 8 is freed from the openings 15 and the closure member 8 can be withdrawn from the receiving element 11.

In the illustrated embodiment, the cooperating closure member 8 is rotated by the handgrip 33 by 90°, so that the closure member 8 can either be inserted into the receiving element 11 or can be withdrawn therefrom. It is to be understood that other angles of rotation are also possible in order to be able to insert the cooperating closure member 8 into the closure member 7. The conically tapered insertion part 18 facilitates insertion of the closure member 8 into the receiving element 11. The collar 21 of the cooperating closure member 8 forms a stop during insertion, so that the closure member 8 cannot be inserted too far into the receiving element 11. The handgrip 33 is disposed on that side of the collar 21 remote from the locking element 15 (FIG. 2). Rotatably disposed on the connector 10A between the handgrip 33 and the collar 21 is a chain link 5 of a tread grid portion of the tire chain. As a result, in the region of the cooperating closure member 8 the tread grid can be disposed near the closure. Similarly, in the region of the closure member 7 the corresponding end of the connection location 2 of the tread grid is disposed immediately adjacent the receiving element 11. The appropriate chain link 5 is likewise rotatably disposed on the connector 9A of the closure member 7 between the receiving element 11 and a supporting member 39 (FIG. 2) that is disposed between the chain link 5 and the sleeve 9. Thus, in the region of the closure 7, 8, adjacent portions of the chain tread grid are not spaced any further from one another than in the remaining regions of the mounting ring 1, so that uniform traction characteristics are assured over the entire periphery of the tire chain.

In principle, the handgrip 33 could also be pressed onto the sleeve 9, so that the closure member 7 would be rotated relative to the cooperating closure member 8 to open and close the closure.

The inventive closure assures a reliable mounting and reliable operating characteristics. In addition, the tire chain can be removed easily from the tire. Manufacturing costs for the closures 7, 8 are very low, so that the inventive tire chain can be produced in an economical manner.

The mounting ring 1 can be made of any suitable material that enables a torsional movement for activating the closure as well as a torsional force for effecting a return to the starting position. Thus, for example, the torsional movement could be effected by a spring steel, a plastic part, leg springs, etc.

To remove the tire chain from the tire, it is advantageous for the closure 7, 8 on the inner side to assume the ten or two o'clock position. When the cooperating closure member 8 or the closure member 7 is rotated with the aid of the handgrip 33, and the locking element 15 is released from the openings 14 of the receiving element 11, the cooperating closure member 8 of the tire chain is automatically pulled out of the receiving element 11, whereby the closure is easily opened.

Figure 5:
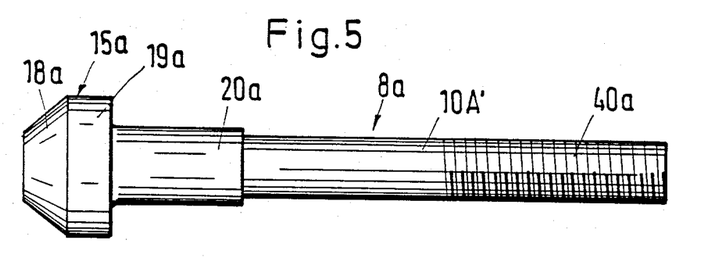
FIG. 5 is a view that shows a second inventive embodiment of a cooperating closure member of the mounting ring.

In the embodiment illustrated in FIG. 5, the cooperating closure member 8a has a different configuration. In other respects, the tire chain is embodied in the same manner as was the previous embodiment. The cooperating closure member 8a has an insertion part 18a and connected thereto a collar 19a. Both of these parts are again embodied as one piece, and are essentially the same as with the previous embodiment. Connected to the collar 19a is the intermediate piece 20a, which has a circular cross-sectional shape. At a distance from the collar 19a, the intermediate piece 20a passes into the connector 10A', which has a smaller diameter and is provided with a blind hole 40a that opens in its end face. A similar blind hole 40 is also provided in the connector 10A of the cooperating closure member 8 (FIG. 3). The end of the cable 3 can be inserted into this blind hole. The closure with this cooperating closure member 8a is released and closed in the same way as with the previously described embodiment.

Figure 6:
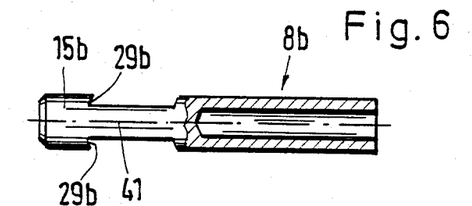
FIG. 6 is a view that shows a further embodiment of a cooperating closure member for the mounting ring.

The cooperating closure member 8b of FIG. 6 has a locking element 15b which at one end face is merely chamfered in order to be able to reliably insert it into the receiving element 11 of the closure member 7. As with the locking elements 15 and 15a, the locking element 15b has a quadratic cross-sectional shape. The locking faces 19b that are remote from the end face do not extend at right angles as in the previous embodiments, but rather extend at an acute angle to the longitudinal axis 41 of the cooperating closure member 8b. In this way, a barb-like configuration is obtained that very reliably prevents loosening of the cooperating closure member 8b from the closure member 7. With the angularly extending locking faces 29b, the locking element 15b rests tightly against the edge 30 of the openings 40 of the closure member 7 when the closure is closed. Since the locking faces 29b extend at an angle, an additional protection against loosening is provided. In other respects, the tire chain equipped with the cooperating closure member 8b is embodied in the same way as was the first embodiment.

Figure 8:
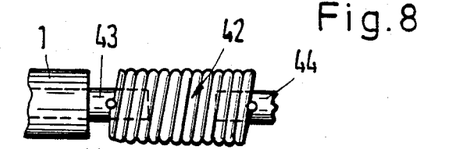
FIG. 8 is a view that shows a twisting element of the inventive tire chain.

In the embodiments described, the cable 3 could be twisted about its axis. However, it is also possible to integrate a separate twisting element into the inner portion of the tire chain. Such an embodiment is shown in FIG. 8. The twisting element 42 is a coil spring that is provided adjacent to the handgrip 33 of the mounting ring 1. The mounting ring 1 is interrupted in the region of the twisting element 42, which connects the end 43 of the mounting ring 1 to the end 44 of the cooperating closure member 8 (FIG. 1). By turning the closure member 8 with the handgrip 33, the spring 42 is twisted, so that the insertion part 18 can be aligned in the described manner relative to the receiving element 11 of the closure member 7.

Figure 9:
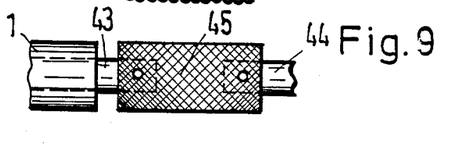
FIG. 9 is a view that shows a second exemplary embodiment of a twisting element for the inventive tire chain.

In the embodiment of FIG. 9, the torsion element 45 is made of plastic or rubber, and is a solid cylinder. The ends 43 and 44 of the mounting ring 1 and cooperating closure member 8 respectively are embedded in the plastic or rubber of the torsion element 45. When the closure is closed or released, the torsion element 45 is twisted, so that the insertion part 18 can pass into the receiving element 11 or can be withdrawn therefrom.

In the described embodiments, the mounting ring 1 can be a resilient ring. However, instead of the cable 3, it would also be possible to use square steel, round steel, or flat-bar steel for the mounting ring. In addition, in place of these materials it would also be possible to use another material for the mounting ring 1, such as aluminum, plastic, etc.

Figure 10:
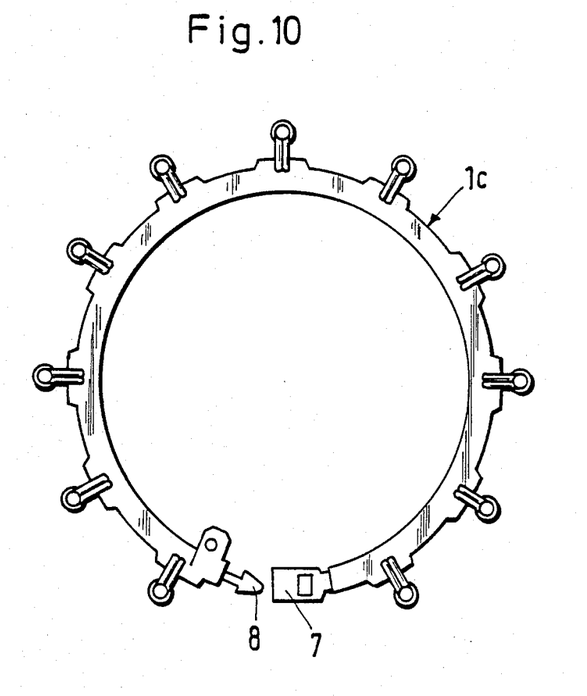
FIG. 10 is a view that shows another exemplary embodiment of a mounting ring for the inventive tire chain.
Figure 11:
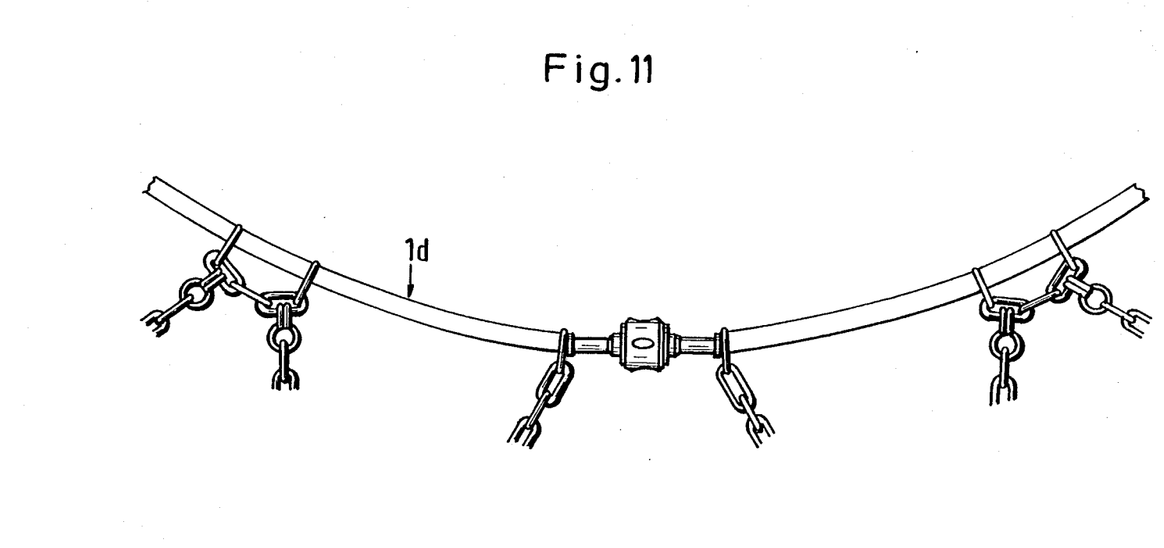
FIG. 11 is a view that shows a portion of a mounting ring of the inventive tire chain with a further exemplary embodiment of a closure.

The mounting ring 1c of FIG. 10 is essentially circular, and is resilient. It can be made of plastic, or even a metal such as steel, aluminum, or the like. The mounting ring 1c is a single piece. The closure member 7 and the cooperating closure member 8 are secured at the two ends of the ring. These closure members are embodied in the same way as the embodiment of FIGS. 1–4.

In the embodiment of FIGS. 11–18, the closure on the mounting ring 1d is formed by a snap closure that can be opened and closed rapidly. The snap closure of this embodiment has a closure member 7d and a cooperating closure member 8d that are secured to respective ends of the mounting ring 1d, which is resilient. Each of the closure members 7d and 8d are secured to the cable 3d of the mounting ring 1d via a press sleeve 9d or 10d. The cooperating closure member 8d is embodied as an insertion member and is provided with the insertion part 18d and the collar 19d. Disposed between the insertion part 18d and the collar 19d is the intermediate piece 20d, which has a smaller diameter than do the insertion part 18d and the collar 19d, which have the same diameter. This forms an annular groove 46 between the insertion part 18d and the collar 19d; the locking elements 47 can engage or snap into this annular groove 46.

Figures 12, 13, 14, 15, 16, 17, 18:
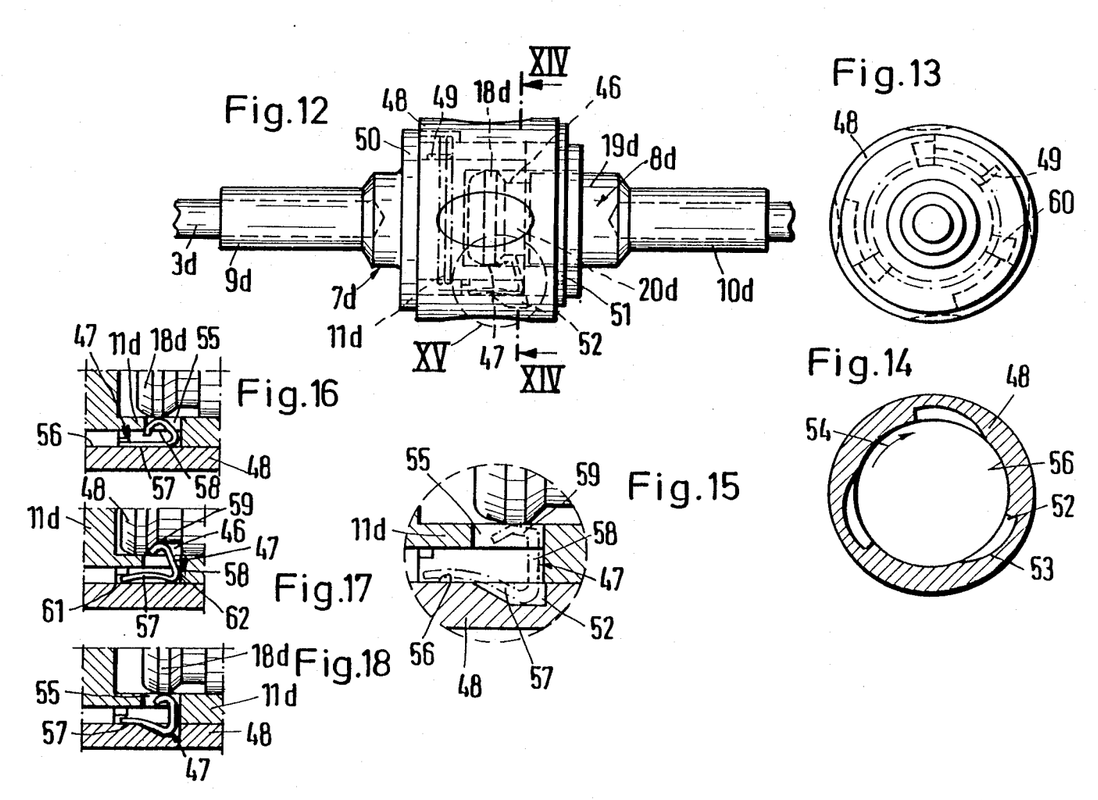
FIG. 12 is an enlarged view of the closure of FIG. 11.
FIG. 13 is an end view of the closure of FIG. 12.
FIG. 14 is a cross-sectional view taken along the line XIV—XIV in FIG. 12.
FIG. 15 is an enlarged cross-sectional view of the dashed-line encircles region of FIG. 12.
FIGS. 16–18 are views similar to that of FIG. 15 showing the various positions of the closure parts when the closure is being closed or opened.

The closure member 7d has a sleeve-like receiving element 11d into which the insertion part 18d is inserted. The receiving element 11d is surrounded by a cylindrical coupling element 48 that can be turned relative to the receiving element 11d against the force of a torsion spring 49. As shown in FIG. 12, the coupling element 48 rests against a collar 50 of the closure member 7d, and is axially secured on the opposite side by a retaining ring 51 that is disposed on the receiving element 11d. One end of the torsion spring 49 is secured to the receiving element 11d, and the other end thereof is secured to the coupling element 48. As shown in FIG. 14, three pocket-like recesses 52 are disposed over the inner periphery of the coupling element 48. In the direction of rotation 54, the bases 53 of the recesses 52 rise continuously until they reach the inner wall 56.

The wall of the receiving element 11d is provided with recesses 55 (FIG. 15) that are similarly distributed over the periphery; respective locking elements 47 project into these recesses 55. These locking elements 47 rest against the inner wall 56 of the coupling element 48. As shown in FIGS. 12 and 15, the locking elements 47 are approximately in the shape of a "7". One leg 57 of the locking element 47 is continuously curved and merges with a linear leg 58 that is disposed at an acute angle thereto; the free end 59 of the leg 58 is angled off in the shape of a "V". The leg 57 of the locking element 47 rests against the inner wall 56 of the coupling element 48.

When the cooperating closure member 8d is withdrawn from the closure member 7d, the coupling element 48 assumes an end position in which, under the force of the torsion spring 49, it rests against a stop 60 of the receiving element 11d (FIG. 13). In this position, the recesses 55 in the receiving element 11d are covered by the inner wall 56 of the coupling element 48. As a result, the locking elements 47 extend through the recesses 55 in the receiving element 11d, and are disposed in the region of movement of the insertion part 18d of the cooperating closure member 8d. To close the snap closure, the insertion part 18d of the cooperating closure member 8d is inserted into the receiving element 11d. As shown in FIG. 16, the insertion part 18d encounters the legs 58 of the locking elements 47 that project out of the recesses 55. As the insertion part 18d is inserted further, the legs 58 are resiliently bent, whereby the other legs 57 of the locking elements 47 come to rest against the inner wall 56 of the rotatable coupling element 48. As shown in FIG. 16, the legs 57 are resiliently bent during this process in such a way that their entire length rests against the inner wall 56. The legs 58 are bent elastically to such an extent that the insertion part 18d can be shoved past the locking elements 47 into its end position. The locking elements 47 then spring back into their end position, in which the free ends 59 of the legs 58 engage the annular groove 46 (FIG. 17), thus securing the cooperating closure member 8d from being pulled out.

The locking elements 47 are axially secured by stops 61 and 62 of the receiving element 11d, so that during insertion of the insertion part 18d, the legs 57 of the locking elements 47 come to rest against the stop 61 and are then resiliently bent. In the locking position shown in FIG. 17, the other stop 62 prevents the snap closure from being released when the cooperating closure member 8d is pulled back, at which time the leg 58 rests against the stop 62, thus preventing the leg 58 from being resiliently bent into a release position.

To release the snap closure, the rotary coupling element 48 must be turned against the force of the torsion spring 49, and relative to the receiving element 11d, counter to the direction of rotation 54. In so doing, the pocket-like recesses 52 pass into the region of the locking elements 47 (FIG. 18). If in this position of the coupling element 48 the cooperating closure member 8d is pulled out of the receiving element 11d, the locking elements 47 are bent back by the insertion part 18d, accompanied by resilient bending of the legs 57, into the recesses 55 of the receiving element 11d until the insertion part 18d can be withdrawn from the receiving element. The legs 57 of the locking elements 47 are resiliently bent by the insertion part 18d in such a way that they extend into the recesses 52 of the coupling element 48 (FIG. 18). As soon as the insertion part 18d is pushed over the locking elements 47, the latter again spring back into their starting position. After the coupling element 48 is released, the torsion spring 49 automatically turns it back into the starting position. Both ends of the insertion part 18d are chamfered, so that the locking elements 47 can be elastically bent in an effortless manner when the insertion part is shifted.

The present invention is, of course, in no way restricted to the specific disclosure of the specification and drawings, but also encompasses any modifications within the scope of the appended claims.

What I claim is:

1. In a tire chain having a tread portion that interconnects an inner portion and an outer portion, said inner portion and said outer portion being capable of being located on opposite side of a tire with at least one of said portions being provided with a closure that has two closure members, namely a first closure member and a second cooperating closure member, the improvement wherein:

at least one of said closure members is a twistable closure member which, from a starting position thereof, is connectable and releasable from the other closure member only via a twisting movement into and out of a twisted position thereof, having means to provide a return force, which acts to twist at least one of the closure members in a direction toward said starting position, and only being connectable and releasable in the twisted position by insertion of one of said closure members into the other.

2. A tire chain according to claim 1, which includes a twisting element that has an end to which said twistable closure member is secured for transmittal of twisting movement.

3. A tire chain according to claim 2, in which said twisting element is a cable that extends over the length of said inner tire chain portion, and that has two ends, with a respective one of said closure members being provided at each of said ends.

4. A tire chain according to claim 2, in which said twisting element connects an end of said inner and/or outer tire chain portion with said twistable closure member.

5. A tire chain according to claim 4, in which said twisting element is a coil spring.

6. A tire chain according to claim 4, in which said twisting element is made of twistable material that is plastic.

7. A tire chain according to claim 1, in which said first closure member is provided with a receiving element into which said second cooperating closure member can be inserted.

8. A tire chain according to claim 7, in which said receiving element has a sleeve-like configuration with an approximately oval inner cross-sectional shape.

9. A tire chain according to claim 7, in which said receiving element has at least one locking means for retaining said cooperating closure member therein.

10. A tire chain according to claim 9, in which said cooperating closure member is provided with a locking element that cooperates with said locking means of said receiving element.

11. A tire chain according to claim 10, in which said locking element, on a side that faces said receiving element when said cooperating closure member is inserted into the latter, is provided with at least one insertion part.

12. A tire chain according to claim 11, in which said insertion part is tapered in the direction toward said receiving element.

13. A tire chain according to claim 10, in which, in said starting position, the central longitudinal plane of said locking element is disposed transverse, and substantially perpendicular, to the central longitudinal plane of said receiving element.

14. A tire chain according to claim 13, in which height of said locking element is greater than the inside width of said receiving element measured at right angles to said central longitudinal plane of the latter.

15. A tire chain according to claim 11, in which said locking means of said receiving part comprises opening means that has edges, with said locking element having at least one locking face that cooperates with one of said edges of said opening of said receiving element when said closure is closed.

16. A tire chain according to claim 15, in which said locking face is formed by a side of said locking element remote from said insertion part thereof.

17. A tire chain according to claim 15, in which said locking face is disposed at an acute angle relative to the longitudinal axis of said cooperating closure member.

18. A tire chain according to claim 9, in which at least one of said closure members is provided with a handgrip for producing said twisting movement.

19. A tire chain according to claim 18, in which said handgrip comprises plate means secured to said at least one closure member.

20. A tire chain according to claim 18, in which at least a side of said handgrip that faces a tire in the mounted state is provided with at least one raised portion that is directed toward said tire.

21. A tire chain according to claim 9, in which said first closure member is provided with a rotatable coupling element that is rotatable relative to said receiving element against spring tension.

22. In a tire chain having a tread portion that interconnects an inner portion and an outer portion, said inner portion and said outer portion being capable of being located on opposite side of a tire with at least one of said portions being provided with a closure that has two closure members, namely a first closure member and a second cooperating closure member, the improvement wherein:

at least one of said closure members, from a starting position, is connectable and releasable from the other closure member via a twisting movement, having means to provide a return force, which acts to twist at least one of the closure members in a direction toward said starting position, only being connectable and releasable in the twisted position by insertion of one of said closure members into the other;

said first closure member being provided with a receiving element into which said second cooperating closure member can be inserted;

said receiving element having at least one locking means for retaining said cooperating closure member therein;

said cooperating closure member being provided with a locking element that cooperates with said locking means of said receiving element, said locking element, on a side that faces said receiving element when said cooperating closure member is inserted into the latter, being provided with at least one insertion part;

said first closure member is provided with a rotatable coupling element that is rotatable relative to said receiving element against spring tension; and said locking means of said receiving element being disposed in a region between the latter and said rotatable coupling element, with the latter being provided with recesses for receiving said locking means for effecting release of said cooperating closure member from said receiving element.

* * * * *